2,740,732
Patented Apr. 3, 1956

2,740,732

PROCESS OF BONDING A METAL FILM TO A THERMOPLASTIC SHEET AND RESULTING PRODUCT

David B. Peck and Preston Robinson, Williamstown, Mass., assignors to Sprague Electric Company, North Adams, Mass., a corporation of Massachusetts No Drawing. Application July 16, 1951,
Serial No. 237,050

9 Claims. (Cl. 117—227)

This invention relates to new and improved condenser sections, and to methods of manufacturing these sections. This application is a continuation in part of copending applications bearing Serial Numbers 118,198 and 204,546, filed September 27, 1949, and January 5, 1951, respectively.

A great many attempts have been made to manufacture condenser sections without the use of separate electrode foils by applying a metal film to a dielectric sheet. None of these attempts have proved completed satisfactory because of the limitations of the specific dielectrics used.

Frequently the physical properties of the dielectric material are such that the metal film is not adequately bonded to the matrix surface, or is bonded in such a manner that handling of the metallized dielectric will cause flaws in the metal film. In other cases, the electrical properties of the dielectric sheet are undesirable in one or more aspects, for example, the maximum temperature for operation may be lower than that desired. Paper, as a supporting dielectric sheet, cannot be operated at temperatures in excess of 125° C. for extended periods, and even at 125° C. is subject to early failure. It is necessary to impregnate metallized paper capacitors, usually with a hydrocarbon wax.

It is an object of this invention to overcome these and other defects of condensers employing metallized dielectrics. Another object is to produce condenser sections which are superior to the metallized film type condensers which are presently produced. These and other objects of the invention will be apparent from the specification and the annexed claims.

The aforegoing objects are attained by virtue of the discovery that metallic films under certain conditions may be firmly bonded to sheets of substantially linear polyester polymers conforming to the general recurrent formula:

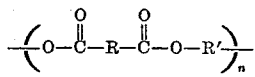

in which R represents a bivalent radical containing the benzene nucleus and in which R' represents a bivalent aliphatic radical containing from 2 to 8 carbon atoms. The molecular orientation in these sheets is of prime importance in obtaining a satisfactory bond. On highly planar oriented sheets of these polyesters the metal deposit sticks in lines roughly corresponding to the lines of the molecules in the oriented surface. The metal adhesion is low on this type of surface except along the molecular chains and the metal film resistance is high between chains. The invention here involved consists of making the molecules on the surfaces of such resin sheets randomly oriented so that a uniform and adequate bond exists between the metal film and the resin sheet and that a uniform electrical resistance exists in the metal film.

According to one modification of the invention metallizing of a polyester sheet of the indicated variety is carried out under temperature conditions such that the molecular planar orientation of the sheet is not disturbed except upon a later heat treatment of the coated resin. A uniform bond between the metal film and the matrix surface is not achieved until after this heat treatment.

Another embodiment of the invention is concerned with the production of metallic film on the indicated type of polyester base by a metalliizng process such that the molecular orientation of the resin surface only is relaxed at the moment of condensation of a metal vapor on this surface.

A third embodiment of the invention of particular utility in forming terminal connections, involved a metal to resin bond obtained by spraying a heavy metal layer directly onto a resin surface while the latter is held at a temperature sufficient to completely relax and disorient the molecular arrangement of this surface.

A preferred dielectric film for use herein is a linear condensation polymer of ethylene glycol and terephthalic acid. This resin is sold under the trade name "Terylene." Other acceptable polyesters are the condensation polymers of terephthalic acid with propylene or butylene glycol, and of chlorinated or otherwise substituted di-basic aromatic acids and substituted glycols, which will condense to form linear polymers.

With metal bonds of the type mentioned with the initial embodiment of the invention, polyester films of the indicated variety are continuously metallized in a reduced pressure enclosure, usually with a cooling panel against which the back of the film rests at the moment of metallizing.

With most metallic films it is preferable to first apply a thin condensed undercoat of silver or molybdenum to the resin surface. This application of metal as well as the subsequent deposition is accomplished under conditions such that the orientation of the resin, including the surface, is unaffected by the heat of condensation of the metal vapor and the layer provides nuclei for subsequent metal deposition. Copper, zinc, lead, aluminum, and other metals and in certain special cases, alloys may then be metallized over this base coat in a similar manner, that is, under conditions such that the heat of condensation does not alter the film orientation.

A firm bond between the polyesters and the metal films may be created after this step by heating the metallized resin at a temperature sufficient to relax the molecular orientation, at least on the surface of the film. This heating may be carried out in an oven or oil bath as described in the copending Robinson and Peck application, Serial Number 237,049, filed July 16, 1951 (now Patent No. 2,735,970, granted February 21, 1956), after wound condenser units have been formed. With "Terylene" films treatment temperatures of from 165° C. to 218° C. give satisfactory results.

In an example of this embodiment 1 mil "Terylene" films are first coated with a sufficient silver to provide the surface of the resin with crystal forming nuclei in reduced pressure metallizing machine running under 1000 microns of mercury pressure. A film speed of 90 feet per minute was used and the film was backed by a water cooled smooth platen at the point of zinc deposition. Then, a zinc coating is evaporated from a pot of the molten metal and condensed on the cool film under the same conditions, in the same operation. Sufficient metal is used to obtain a shiny deposit by this step. Films which have been coated in this manner are then heated (as in an oven) to 200° C. for a period of 30 minutes to relax and partially disorient the polyester surface.

This last heating operation need not be carried out in an oven bath or an oil bath. Heated rollers accomplish the same results.

Bonds of the type forming the second preferred embodiment of this invention may be formed by following the same procedure indicated in the above example, except that the deposition conditions are modified such that the heat of condensation of the metal vapor is sufficient to relay the surface of the polyester film without relaxing the inner polyester mass. This may be accomplished, for example, through film speed decrease and/or the metal vapor temperature increase and, of course, the subsequent heating step may be omitted. By proper operation of this procedure the temperature of the principal portion of the "Terylene" film does not advance beyond 130° C. in temperature, while the surface of the polyester is approximately 200° C. It is to be understood that these temperatures are estimates based upon the final analysis of the bonded product. With other resins besides "Terylene" which conform to the indicated groups, other treatment conditions may be employed such that merely the surface of the polyester is randomly oriented. The same metals and procedures may be used with this modification as were used in the preceding embodiment.

For application of heavy metal layers, as in the provision of terminal connections to rolled capacitor edges, these same metals and also alloys may be sprayed directly onto the edges of the polyester film of the indicated variety under conditions such that the surface of the film is at a temperature above its melting point. Heated vapors and particles of these metals can be used in this manner. A firm fused metal to resin bond is obtained because of the interspersing of metal particles in the molten resin mass, which upon cooling, is, of course, disoriented.

As an example of this modification of the invention edges of capacitors wound with 1 mil "Terylene" film can be provided with terminal connections by being sprayed with zinc metal whose particle temperature at the moment of contact with the film is between about 250° C. and about 420° C. at atmospheric pressure. According to a preferred embodiment of the invention, the metallized dielectric film is assembled into capacitor form and then heated above the relaxation temperature. This is particularly desirable when the metal deposition has been accomplished without relaxation of the polyester planar orientation.

A further embodiment of the invention calls for deposition of increased thickness of metal at the edges of the film which are to be provided with terminal contacts, in order to improve the strength of the contact and reduce the electrical resistance of the joint. This is particularly desirable when the joint is actually transformed into a fused mass of metal particles and disoriented resin. The ratio of metal film thickness at this edge to the metal film thickness in the body of the capacitor is at least 2:1 and preferably 3:1.

While the results are not directly comparable to those achieved by practice of the above embodiments, it is also possible to produce metal films on disoriented films of the polyesters set forth. Such disorientation may be accomplished by heating the polyester to a temperature at which the "elastic memory" that is, the relaxation temperature, of the resin is permitted to function, but beneath the temperature at which the resin melts. The metallizing on such films may be carried on in any of the conventional manners known to the art.

The metallized films formed in accordance with this invention are of particular utility in condenser constructions. They may be wound into condenser units possessing superior properties by virtue of the dielectrics employed. The coated polyester films set forth are successfully used with other additional dielectric films such as films of polystyrene, impregnated paper, and the like. Such additional films may be bonded directly to the polyester, or may comprise a separate sheet.

As many different embodiments of this invention may be made without departing from the spirit and scope hereof, it is to be understood that the invention is not limited to the specific embodiments hereof except as defined in the appended claims.

We claim:

1. The process of bonding a metal film to a substantially linear thermoplastic planar oriented dielectric polyester sheet conforming to the recurrent formula:

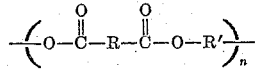

wherein R represents a bivalent radical containing the benzene nucleus and R' represents a bivalent aliphatic radical containing from 2 to 8 carbon atoms, which comprises condensing a metal vapor on the surface of said sheet and heating said surface to a temperature above its relaxation temperature, thereby disorienting said surface which results in a firm and uniform bonding of the condensed metal thereto.

2. A process as defined in claim 1 in which said polyester is a linear condensation polymer of terephthalic acid and ethylene glycol.

3. A process as defined in claim 1 in which said metal film consists essentially of zinc superimposed on a layer of silver.

4. A process of firmly attaching a metal film to a substantially linear thermoplastic molecularly oriented sheet conforming to the recurrent formula:

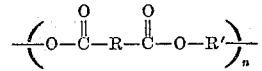

wherein R represents a bivalent radical containing the benzene nucleus, and R' represents a bivalent aliphatic radical containing from 2 to 8 carbon atoms, which comprises condensing the vapors of a metal directly upon an unheated surface of said sheet, and heating the combined metal film and polyester sheet at a temperature sufficient to relax the planar orientation of said surface thereby firmly and uniformly bonding the condensed metal to the surface.

5. A metal coated resin film comprising a film conforming to the recurrent formula:

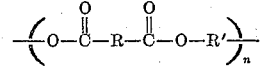

wherein R stands for a bivalent radical containing the benzene nucleus, and R' represents a bivalent aliphatic radical containing from 2 to 8 carbon atoms, having a planar oriented body and a thermally partially disoriented surface, and a vapor-deposited metal film uniformly bonded to said disoriented surface.

6. A coated film as defined in claim 5 in which said polyester is a condensation product of terephthalic acid and ethylene glycol.

7. A metallized polyester film comprising a partially disoriented polyester sheet conforming to the recurrent formula:

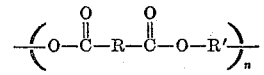

wherein R represents a bivalent radical containing the benzene nucleus, and R' represents a bivalent aliphatic radical containing from 2 to 8 carbon atoms, and a vapor-deposited metal film uniformly bonded to a disoriented surface of said sheet, said film being obtained by condensing a metal vapor on a surface of a planar oriented polyester sheet followed by heating or said surface until disoriented.

8. A film as defined in claim 7 in which said polyester is a condensation polymer of terephthalic acid and ethylene glycol.

9. A metallized polyester film comprising a partially disoriented polyester sheet conforming to the recurrent formula:

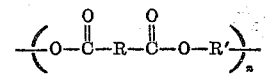

wherein R represents a bivalent radical containing the benzene nucleus, and R' represents a bivalent aliphatic radical containing from 2 to 8 carbon atoms, and a vapor-deposited metal film uniformly bonded to a disoriented surface of said sheet, said metal film having been condensed on a planar oriented surface of the polyester film concurrent with the disorientation of said surface by heating.

References Cited in the file of this patent

UNITED STATES PATENTS

| | | |
|---|---|---|
| 2,103,538 | Kolb | Dec. 28, 1937 |
| 2,312,913 | Kirby | Mar. 2, 1943 |
| 2,332,461 | Muskat et al. | Oct. 19, 1943 |
| 2,382,432 | McManus et al. | Aug. 14, 1945 |
| 2,384,500 | Stoll | Sept. 11, 1945 |
| 2,497,376 | Swallow et al. | Feb. 14, 1950 |